J. M. BAILEY.
Machines for Sharpening Gin-Saws.
No. 135,256. Patented Jan. 28, 1873.
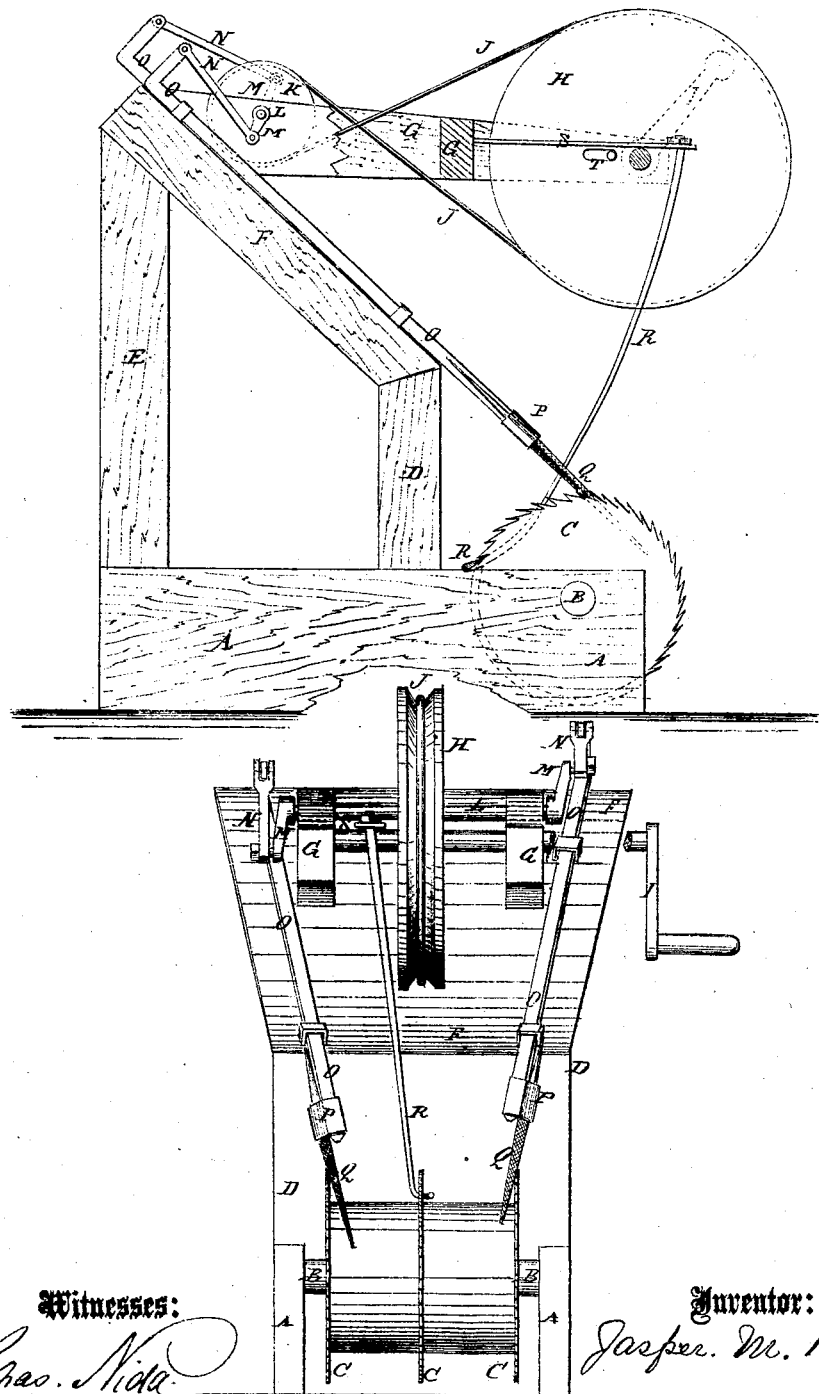

UNITED STATES PATENT OFFICE.

JASPER M. BAILEY, OF MERIDIAN, MISSISSIPPI.

IMPROVEMENT IN MACHINES FOR SHARPENING GIN-SAWS.

Specification forming part of Letters Patent No. 135,256, dated January 28, 1873.

*To all whom it may concern:*

Be it known that I, JASPER M. BAILEY, of Meridian, in the county of Lauderdale and State of Mississippi, have invented a certain Improvement in Machine for Sharpening Gin-Saws, of which the following is a specification:

Figure 1 is a side view of my improved machine, part being broken away to show the construction. Fig. 2 is a front view of the same.

My invention has for its object to furnish an improved machine for sharpening gin-saws which shall be simple in construction, convenient in use, and effective in operation, sharpening the saws while on their shaft. The invention consists in constructing and connecting the file-holder with the operative mechanism so as to economize space and avoid friction.

A is the base-frame of the machine, to the forward end of which is pivoted the shaft B, with the saws C attached to it. To the middle part of the frame A is attached a vertical frame, D, and to the rear end of said base-frame A is attached a vertical frame, E, which should be somewhat higher than the vertical frame D. To the upper ends of the vertical frames D E is attached an inclined frame or plate, F. The difference in height of the frames D E should be such as to give the frame or plate F the inclination that the files should have to operate properly upon the teeth of the saws C. To the upper part of the inclined plate or frame F is firmly attached the rear end of a horizontal frame, G, in bearings in the forward end of which revolve the journals of the driving-wheel or pulley H. To the projecting end of the journal of the wheel or pulley H is attached the crank I, by which the machine is operated. J is a band, which passes around the wheel or pulley H, and around the smaller wheel or pulley K attached to the shaft L, that revolves in bearings attached to or formed in the rear end of the horizontal top frame G. To the ends of the shaft L are attached, or upon them are formed, short cranks M, to the crank-pins of which are pivoted the ends of the short connecting-rods N. The other ends of the connecting-rods N are pivoted to the upper or rear ends of the sliding bars O, which ends may be turned upward, as shown in Fig. 1, to enable the connecting-rods N to operate more nearly parallel with the sliding bars O, and thus produce less friction. The bars O slide in guides or keepers attached to the inclined plate or frame F, and to their lower ends are attached the file-holders P, which are so formed as to receive and hold the shanks of ordinary three-cornered or triangular files Q. The holders P should be provided with wedges or set-screws to hold the files securely, and at the same time allow them to be adjusted to bear properly upon the teeth to be sharpened. The shaft B and saws C are revolved through the space of one tooth at each revolution of the wheel or pulley H by the pawl R, the shank of which is made long and is swiveled to the outer or forward end of the spring-bar S, the rear end of which is attached to a cross-bar of the frame G. The spring-bar S is operated to raise the pawl R and revolve the saws by a cam-pin, T, the inner end of which is bent at right angles, has a slot formed in it, and is set in a groove in the side of the wheel or pulley H, where it is adjustably secured in place by a screw passing through the said slot and screwing into the said wheel or pulley, so that the said pin T may be moved toward or from the center of the wheel or pulley H, according as the teeth of the saws C are finer or coarser. The cam-pin T may be made adjustable in other ways, if desired.

Having thus described my invention, I claim as new and desire to secure by Letters Patent—

A file-holder, O, having a turned-up end, which is connected by link N with the crank M of a drive-wheel, as described, so as to give a reciprocating motion in the smallest space and without friction.

JASPER M. BAILEY.

Witnesses:
 A. D. HAMMACK,
 J. W. BARBER.